US010850789B2

(12) United States Patent
Wraith

(10) Patent No.: US 10,850,789 B2
(45) Date of Patent: Dec. 1, 2020

(54) MOTORIZED TRANSPORTATION SCOOTER

(71) Applicant: Ford Global Technologies, LLC, Dearborn, MI (US)

(72) Inventor: Paul Jonathan Alexander Wraith, Lexden Colchester (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 228 days.

(21) Appl. No.: 16/087,452

(22) PCT Filed: Jul. 15, 2016

(86) PCT No.: PCT/US2016/042417
§ 371 (c)(1),
(2) Date: Sep. 21, 2018

(87) PCT Pub. No.: WO2017/164912
PCT Pub. Date: Sep. 28, 2017

(65) Prior Publication Data
US 2019/0118893 A1   Apr. 25, 2019

Related U.S. Application Data

(60) Provisional application No. 62/311,594, filed on Mar. 22, 2016.

(51) Int. Cl.
*B62K 15/00*   (2006.01)
*B62K 5/027*   (2013.01)
(Continued)

(52) U.S. Cl.
CPC .............. *B62K 15/006* (2013.01); *B60N 2/24* (2013.01); *B60N 2/3013* (2013.01);
(Continued)

(58) Field of Classification Search
CPC ........................... B62K 15/008; B60N 2/3013
See application file for complete search history.

(56) References Cited

U.S. PATENT DOCUMENTS 3,004,619 A * 10/1961 Sorrell Straussler ... B60F 5/003
                                                        180/208
4,919,225 A *  4/1990 Sturges .................... B62K 7/00
                                                        180/210
(Continued)

FOREIGN PATENT DOCUMENTS

CN       1037113 A     11/1989
CN       2739061 Y     11/2005
(Continued)

OTHER PUBLICATIONS

Chinese Notification of First Office Action dated Dec. 2, 2019 re Appl. No. 2016800839004 (English).
(Continued)

*Primary Examiner* — Nicole T Verley
(74) *Attorney, Agent, or Firm* — Brandon Hicks; Bejin Bieneman PLC

(57) ABSTRACT

A scooter includes a front platform and a driver platform rotatably connected to each other and each having a planar surface. Wheels are rotatably connected to the front platform and the driver platform, and a motor is in at least one of the wheels. The front platform and the driver platform are relatively rotatable between a stowed position in which the planar surfaces are in separate planes and a cargo position in which the planar surfaces are coplanar.

16 Claims, 6 Drawing Sheets

(51) Int. Cl.
  *B60N 2/30* (2006.01)
  *B60N 2/24* (2006.01)
  *B62D 61/06* (2006.01)
  *B62D 21/18* (2006.01)
  *B62K 5/05* (2013.01)
  *B62K 7/00* (2006.01)
  *B62K 11/00* (2006.01)

(52) U.S. Cl.
  CPC ......... *B60N 2/3047* (2013.01); *B62D 21/183* (2013.01); *B62D 61/065* (2013.01); *B62K 5/027* (2013.01); *B62K 5/05* (2013.01); *B62K 7/00* (2013.01); *B62K 11/00* (2013.01); *B62K 15/00* (2013.01); *B60L 2200/20* (2013.01)

(56) References Cited

U.S. PATENT DOCUMENTS

| | | | | |
|---|---|---|---|---|
| 4,944,360 | A * | 7/1990 | Sturges | B62D 61/08 180/208 |
| 6,866,109 | B2 * | 3/2005 | Roach | B62K 3/002 180/65.1 |
| 7,654,356 | B2 * | 2/2010 | Wu | B62K 5/025 180/208 |
| 7,882,918 | B2 | 2/2011 | Chin et al. | |
| 7,967,095 | B2 * | 6/2011 | Kosco | B62K 15/006 180/208 |
| 8,365,850 | B2 * | 2/2013 | Gal | B62B 5/0026 180/65.1 |
| 8,627,910 | B1 * | 1/2014 | Carque | B62K 15/00 180/65.1 |
| 8,864,171 | B1 * | 10/2014 | Callahan | B62K 3/16 280/755 |
| 9,114,843 | B2 * | 8/2015 | Ryan | B62K 15/006 |
| 9,227,687 | B2 * | 1/2016 | Delgatty | B62K 19/06 |
| 9,265,675 | B2 * | 2/2016 | Ransenberg | B62K 5/025 |
| 9,272,739 | B2 * | 3/2016 | Zaid | B62K 15/008 |
| 10,150,528 | B2 * | 12/2018 | Kano | B62K 5/06 |
| 10,549,809 | B2 * | 2/2020 | Kuo | B62K 3/002 |
| 10,562,583 | B1 * | 2/2020 | Chan | B62K 15/008 |
| 10,617,591 | B1 * | 4/2020 | Neville | A61H 3/04 |
| 10,640,166 | B2 * | 5/2020 | Kama | B62K 5/025 |
| 10,647,377 | B2 * | 5/2020 | Zhang | B62K 15/008 |
| 2005/0077097 | A1 * | 4/2005 | Kosco | B62K 15/006 180/208 |
| 2006/0191726 | A1 | 8/2006 | Matte | |
| 2009/0115160 | A1 * | 5/2009 | Chiu | B62K 15/008 280/278 |
| 2009/0308676 | A1 * | 12/2009 | Wang | B62K 15/006 180/208 |
| 2013/0192908 | A1 | 8/2013 | Schlagheck | |
| 2015/0209205 | A1 * | 7/2015 | Ransenberg | A61G 5/0883 280/641 |
| 2018/0118299 | A1 * | 5/2018 | Lu | B62K 21/16 |
| 2018/0271726 | A1 * | 9/2018 | Wang | B62M 6/90 |
| 2020/0047840 | A1 * | 2/2020 | Newby | B62K 15/008 |

FOREIGN PATENT DOCUMENTS

| | | | |
|---|---|---|---|
| CN | 201132572 Y | 10/2008 | |
| CN | 103448838 A | 12/2013 | |
| CN | 103587618 | 2/2014 | |
| CN | 104276242 A | 1/2015 | |
| DE | 202015103008 U1 | 8/2015 | |
| KR | 101390399 B1 | 4/2014 | |
| NL | 2006612 | 10/2012 | |
| WO | WO-03055737 A1 * | 7/2003 | ........... B62K 15/008 |
| WO | WO-2013093876 A2 * | 6/2013 | ........... B62K 15/008 |
| WO | WO-2017123158 A2 * | 7/2017 | ................ B62J 6/02 |

OTHER PUBLICATIONS

China Trolley, Cargo Trolley, "China Electric Cargo Trolley (DH-PS1-C8 No Fence Light Duty, Curtis Controller, 800W Motor)", Mar. 22, 2016, http://linco-inc-limited.en.made-in-china.com/product/VKiJzhrEjnRQ/China-Electric-Cargo-Trolley-DH-PS1-C8-No-Fence-Light-Duty-Curtis-Controller-800W . . . .

International Search Report and Written Opinion dated Oct. 6, 2016 re Appl. PCT/US2016/42417.

Chinese Notification of Second Office Action dated Jul. 3, 2020 re Appl. No. 2016800839004 (English).

* cited by examiner

MOTORIZED TRANSPORTATION SCOOTER

CROSS-REFERENCE TO RELATED APPLICATIONS

The subject patent application claims priority to and all the benefits of U.S. Provisional Patent Application No. 62/311,594 which was filed on Mar. 22, 2016, which is herein incorporated by reference in its entirety.

BACKGROUND

Urban environments feature various modes of transportation: public transit, including subways and buses; cabs, including traditional taxi cabs and ride-hailing apps; bike-sharing programs; personally owned automobiles or vehicles; and personally owned bicycles. All of these modes of transportation entail some disadvantages or tradeoffs.

Motor vehicles, such as taxi cabs, personal automobiles, and delivery trucks or vans, can be expensive relative to other transportation options and contribute to congestion. Taxi cabs typically cost significantly more than other transportation options, and personal automobiles and delivery vehicles must pay for parking at their destinations. Taxi cabs and automobiles take up significant space in streets compared to, for example, pedestrians or bicycles, and must occupy a parking spot when not in use.

Public transit can reduce pollution and congestion relative to motor vehicles, but public transit has problems with transportation of passengers bringing cargo or children and with reach. Passengers may want to transport bulky or numerous items, which creates difficulties with loading and unloading and with storage in a crowded bus or subway car. Passengers may also be parents or caregivers transporting children, which can create similar issues. The reach of public transit typically does not extend all the way to a passenger's intended destination, leading to what is called the last-mile problem. Also, some cities and some neighborhoods within cities have limited access to public transit.

While bicycles can reduce cost, pollution, and congestion within cities, bicycles have limited capacity, being only able to transport one rider and small items, such as a briefcase or one or two shopping bags. Bicycles cannot transport children without special equipment, which bike-sharing programs typically do not provide. Bike-sharing programs may share the last-mile problem with traditional public transit.

DETAILED DESCRIPTION

Figure 1:
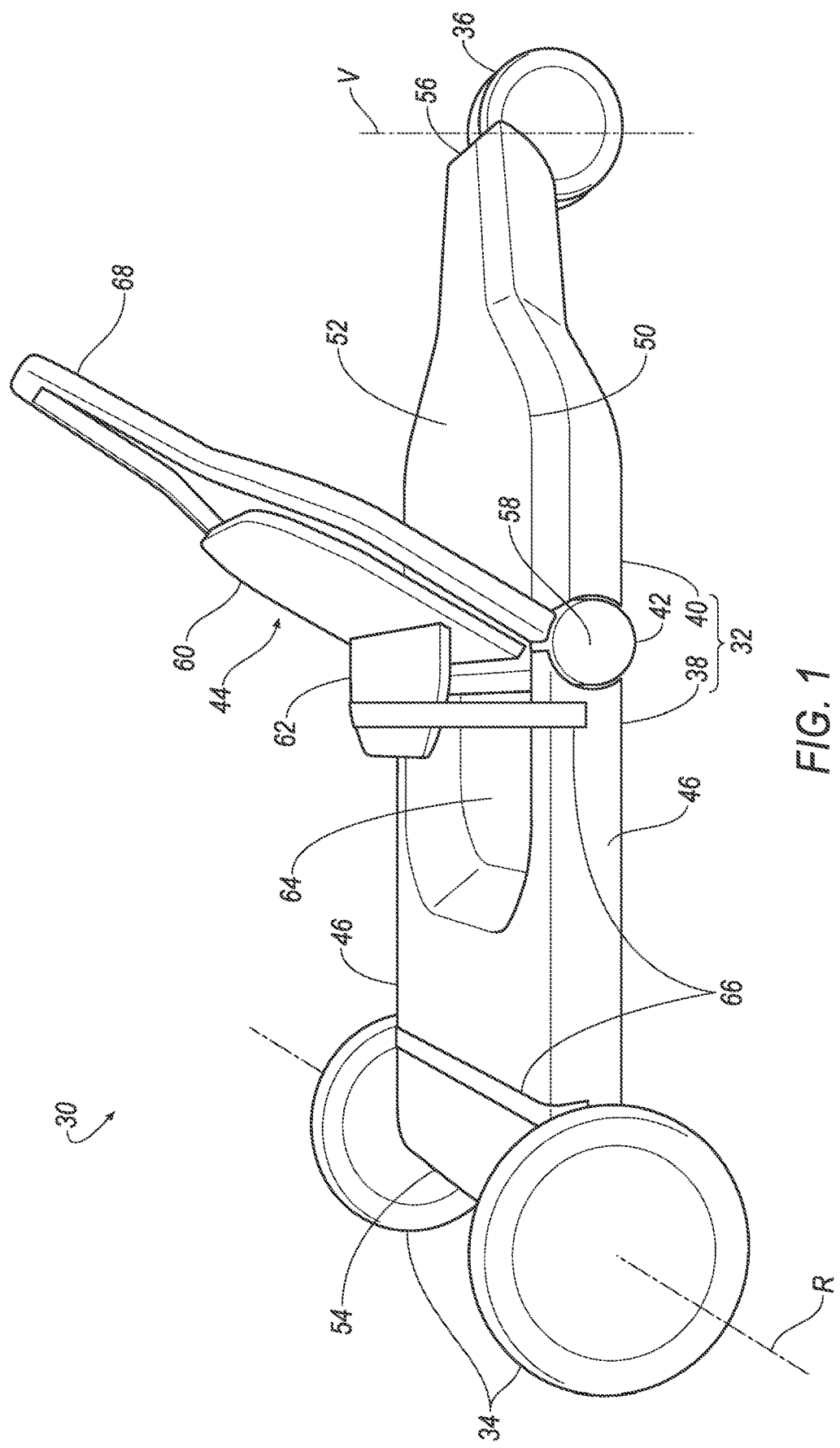
FIG. 1 is a side perspective view of a scooter in a passenger state.

With reference to the Figures, wherein like numerals indicate like parts throughout the several views, a scooter 30 includes a platform 32, two front wheels 34 connected to a front end of the platform 32, and at least one rear wheel 36 connected to a rear end of the platform 32. The platform 32 includes a front platform 38 and a driver platform 40 rotatably connected by a hinge 42. Specifically, the front platform 38 is hingedly connected to the driver platform 40. The front platform 38 may include a stowable seat 44 having an open state (shown in FIG. 1) and a closed state (as shown in FIGS. 2A-C). The front platform 38 has a planar surface 48, and the driver platform has a planar surface 52. The scooter 30 is movable from a stowed state in which the planar surfaces 48, 52 are substantially parallel to each other and a cargo state in which the planar surfaces 48, 52 are coplanar. Specifically, the scooter 30 may be movable between a stowed state, in which the front and driver platforms 38, 40 are oriented vertically and substantially parallel to each other (as shown in FIG. 2A); a cargo state, in which the front and driver platforms 38, 40 are aligned horizontally and the stowable seat 44 is in the closed state (as shown in FIG. 2C); and a passenger state, in which the front and driver platforms 38, 40 are aligned horizontally and axially aligned with each other and the stowable seat 44 is in the open state (as shown in FIG. 1).

The scooter 30 exhibits the versatility to capably handle numerous situations in an urban environment. In the passenger state, the scooter 30 can transport passengers more cost-effectively and energy-efficiently than, for example, a cab. For example, a parent can take his or her children on public transit and then travel the "last mile" using the scooter 30. The scooter 30 can, for example, hold one driver and one adult passenger or two child passengers. In the cargo state, the scooter 30 can transport goods more cost-effectively, more efficiently, and with less pollution than, for example, a delivery van. The scooter 30 in the cargo state has a greater cargo capacity than, for example, a bicycle. The scooter 30 can hold a pallet loaded by, for example, a forklift, or can hold several smaller items, for example, purchased by the driver. In the stowed state, the scooter 30 has a significantly smaller footprint than a cab, a delivery van, or a bicycle, for example, a rental or shared bicycle.

Figures 2A, 2B:
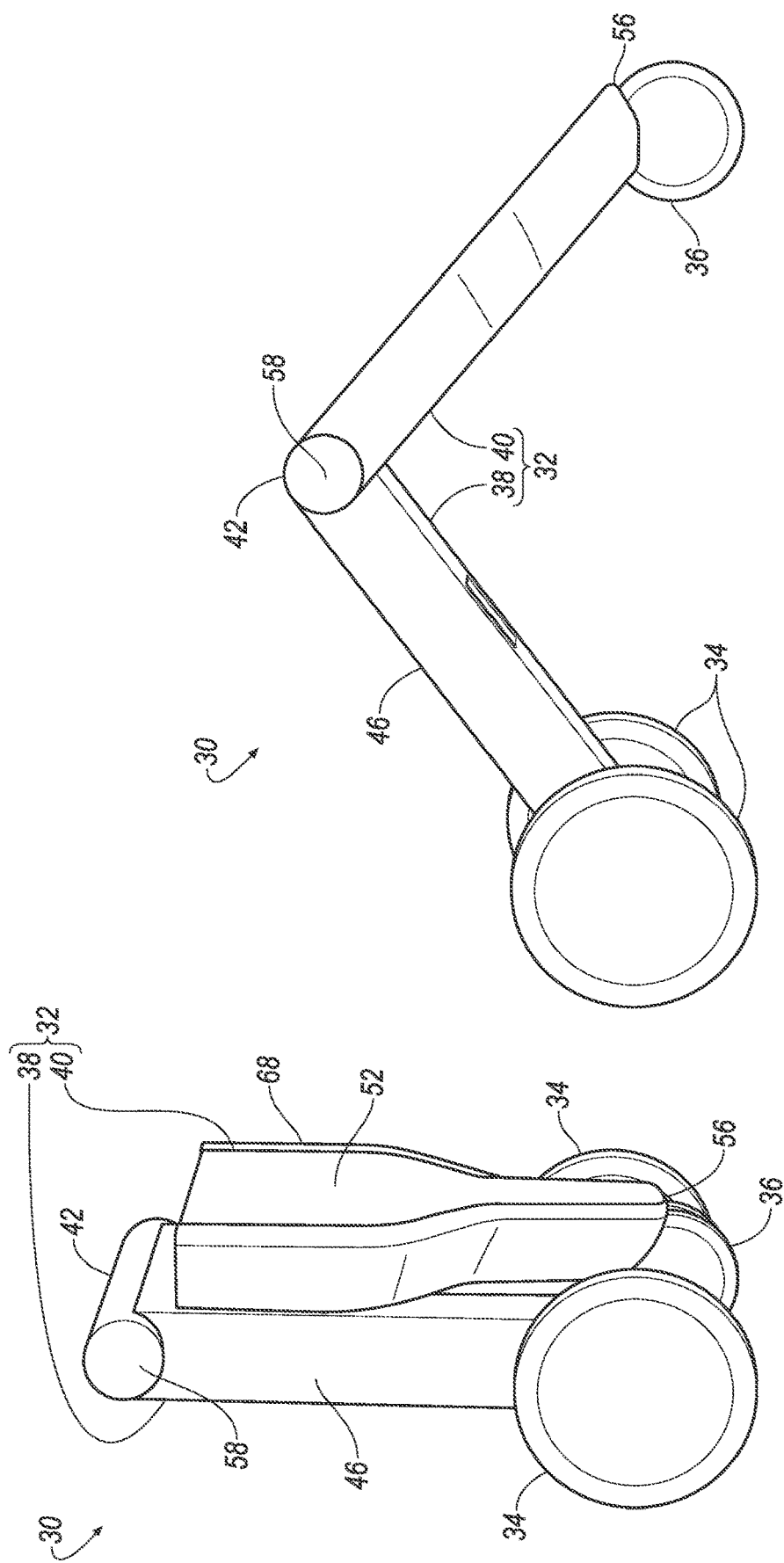
FIGS. 2A-C are side views of the scooter of FIG. 1 in a stowed state, transitioning from the stowed state to a cargo state, and in the cargo state, respectively.
Figure 2C:
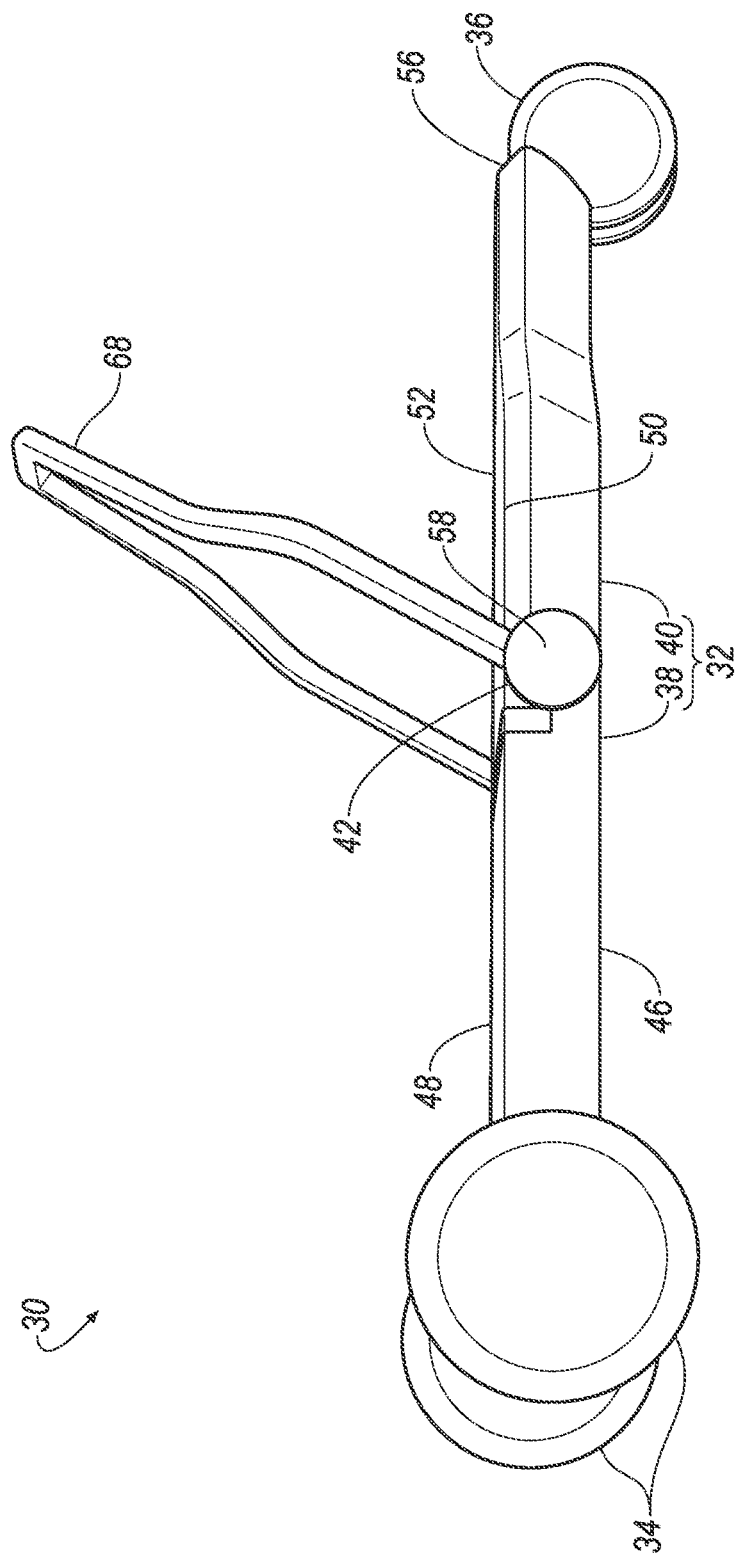

With reference to FIGS. 1 and 2C, the front platform 38 may extend horizontally at the height of an axis of rotation R of the front wheels 34 when the scooter 30 is in the cargo or passenger state. The front platform 38 includes side edges 46 and the planar surface 48 facing upwards and extending between the side edges 46. The front platform 38 supports cargo or occupants on top of the planar surface 48.

The planar surface 48 of the front platform 38 is longer along an axis of rotation of the hinge 42 than a thickness of the front platform 38 perpendicular to the planar surface 48. The planar surface 48 of the front platform 38 is longer perpendicular to the axis of rotation of the hinge 42 than the thickness of the front platform 38. Specifically, the planar surface 48 of the front platform 38 may have a width (parallel to the axis of rotation R of the front wheels 34) of 800 millimeters and a length (in forward direction of travel of the scooter 30) of 1200 millimeters, which are the dimensions of an EUR-pallet, which is a standardized pallet size promulgated by the European Pallet Association. Alternatively, the planar surface 48 of the front platform 38 may have dimensions accommodating a different standardized pallet or frequently transported item or have other dimensions sufficient for accommodating cargo.

The driver platform 40 may extend horizontally at the height of the axis of rotation R of the front wheels 34 when the scooter 30 is in the cargo or passenger state. The driver platform 40 may include a driver-platform edge 50 bordering a planar surface 52 facing upwards.

The planar surface 52 of the driver platform 40 is longer along an axis of rotation of the hinge 42 than a thickness of the driver platform 40 perpendicular to the planar surface 52. The planar surface 52 of the driver platform 40 is longer perpendicular to the axis of rotation of the hinge 42 than the thickness of the driver platform 40. The planar surface 52 may support a driver of the scooter 30 standing on the planar surface 52.

The hinge 42 rotatably connects the front platform 38 and the driver platform 40. Specifically, the hinge 42 is rotatably connected to the front platform 38 and rotatably connected to the driver platform 40. The front platform 38 has a rotation range of at least 90° about the hinge 42, and the driver platform 40 has a rotation range of at least 90° about the hinge 42. An axis of rotation of the hinge 42 is parallel to at least one of the axis of rotation R of the front wheels 34 and an axis of rotation of the rear wheels 36.

With reference to FIG. 1, the scooter 30 may include visibility lights 54, 56, 58, such as headlights 54, brake lights 56, and side lights 58. The headlights 54 may be disposed on the front end of the front platform 38 and face forward. The headlights 54 may be illuminated when the driver has so decided or whenever the scooter 30 is in the cargo or passenger state. The brake lights 56 may be disposed on the rear end of the driver platform 40 and face backwards. The brake lights 56 may be illuminated when the vehicle is braking or whenever the vehicle is in the cargo or passenger state. If the brake lights 56 are illuminated whenever the scooter 30 is in the cargo or passenger state, the brake lights 56 may be illuminated more brightly when the scooter 30 is braking. The side lights 58 may be disposed on the hinge 42 or on the side edges 46 of the front platform 38 or on the driver-platform edge 50. The side lights 58 may be illuminated whenever the scooter 30 is in the cargo or passenger state.

With continued reference to FIG. 1, the front platform 38 may include the stowable seat 44. The seat 44 is attached to the front platform 38. The stowable seat 44 may include a stowable seat back 60 rotatably connected to the hinge 42 and a stowable seat bottom 62 rotatably connected to the seat back 60. The stowable seat 44 is movable from a closed state to an open state; specifically, the stowable seat 44 is movable relative to the front platform 38 from a closed state to an open state. The stowable seat 44 has the open state, in which an occupant may sit on the stowable seat 44; and the closed state, in which the stowable seat 44 is retracted against the front platform 38. The stowable seat 44 in the closed state may be flush with the planar surface 48 of the front platform 38.

The stowable seat back 60 may be rotatably connected to the hinge 42; alternatively, the stowable seat back 60 may be rotatably connected to the front platform 38. The stowable seat back 60 may rotate from a position parallel to the front platform 38 to an upright position transverse to the front platform 38. In the upright position, the stowable seat back 60 may extend upwards so as to provide a back support for an occupant sitting in the stowable seat 44.

The stowable seat bottom 62 may be rotatably connected to the stowable seat back 60. When the stowable seat back 60 is in the upright position, the stowable seat bottom 62 may rotate from a position parallel to the stowable seat back 60 to a horizontal position cantilevered from the stowable seat back 60. In the horizontal position, the stowable seat bottom 62 may provide support for an occupant sitting in the stowable seat 44.

The front platform 38 may include a recess 64 in the planar surface 48. The recess 64 may be sized so as to accept the stowable seat 44 in the closed state. The depth of the recess 64 may be substantially the same as the thickness of the stowable seat 44 in the closed state. The stowable seat 44 may be flush with the planar surface 48 of the front platform 38 when the stowable seat 44 is in the closed state in the recess 64.

A strap 66 may extend across the front platform 38. Specifically, the strap 66 may extend across the planar surface 48 of the front platform 38 when the seat 44 is in the closed state and extend across the seat bottom 62 when the seat 44 is in the open state. The strap 66 or multiple straps 66 may be fixed to the side edges 46 of the front platform 38 or may retract into the front platform 38 at the side edges 46. Each strap 66 may include a ratcheting tightener and/or a buckle and a clip. The straps 66 may be formed of fabric.

A handlebar 68 may be rotatably connected to the hinge 42; alternatively, the handlebar 68 may be rotatably connected to the driver platform 40. The handlebar 68 is movable from a stowed position adjacent to an edge of the driver platform 40 (as shown in FIGS. 2A-B) to a ready position transverse to the driver platform 40 (as shown in FIGS. 1 and 2C). The handlebar 68 rotates between the stowed position, adjacent to the driver-platform edge 50; and the ready position, transverse to the driver platform 40. In the stowed position, the handlebar 68 may be flush with the planar surface 52. In the ready position, the handlebar 68 may extend to approximately the height of a waist of the driver.

The front wheels 34 are rotatably connected to the front platform 38, specifically, the front end of the front platform 38. The front wheels 34 may be disposed at the side edges 46 of the front platform 38. The front wheels 34 may be fixed in a forward-facing direction, i.e., not steerable.

The rear wheels 36 are rotatably connected to the rear end of the driver platform 40. The driver platform 40 may have two or one rear wheels 36 rotatably connected to the driver platform 40. The rear wheels 36 may be laterally centered relative to the scooter 30. The rear wheels 36 may turn relative to a vertical axis V, i.e., steer the scooter 30. The rear wheels 36 may have a smaller diameter than the front wheels 34.

A motor 70 is disposed in and drivably connected to one of the front wheels 34 and rear wheels 36. A motor 70 may also be disposed in and drivably connected to the other of the front wheels 34 and rear wheel 36. Alternatively, at least one front wheel 34 and at least one rear wheel 36 may have a motor 70 disposed therein. Further alternatively, each of the front and rear wheels 34, 36 may have a motor 70 disposed therein. A first motor 70 is disposed in and drivably connected to the front wheel 34, and a second motor 70 is disposed in and drivably connected to the rear wheel 36. The motors 70 are rotatably connected to the front wheels 34 and the front platform 38 or to the rear wheels 36 and the driver platform 40. The motors 70 rotate the wheels 34, 36 with respect to the platforms 38, 40. The motors 70 may be electric motors.

At least some of the wheels 34, 36 may be equipped with brakes 72 (not pictured). The brakes 72 may be any suitable type, including friction brakes such as band, drum, or disc brakes; electromagnetic brakes; or regenerative brakes.

Figure 3:
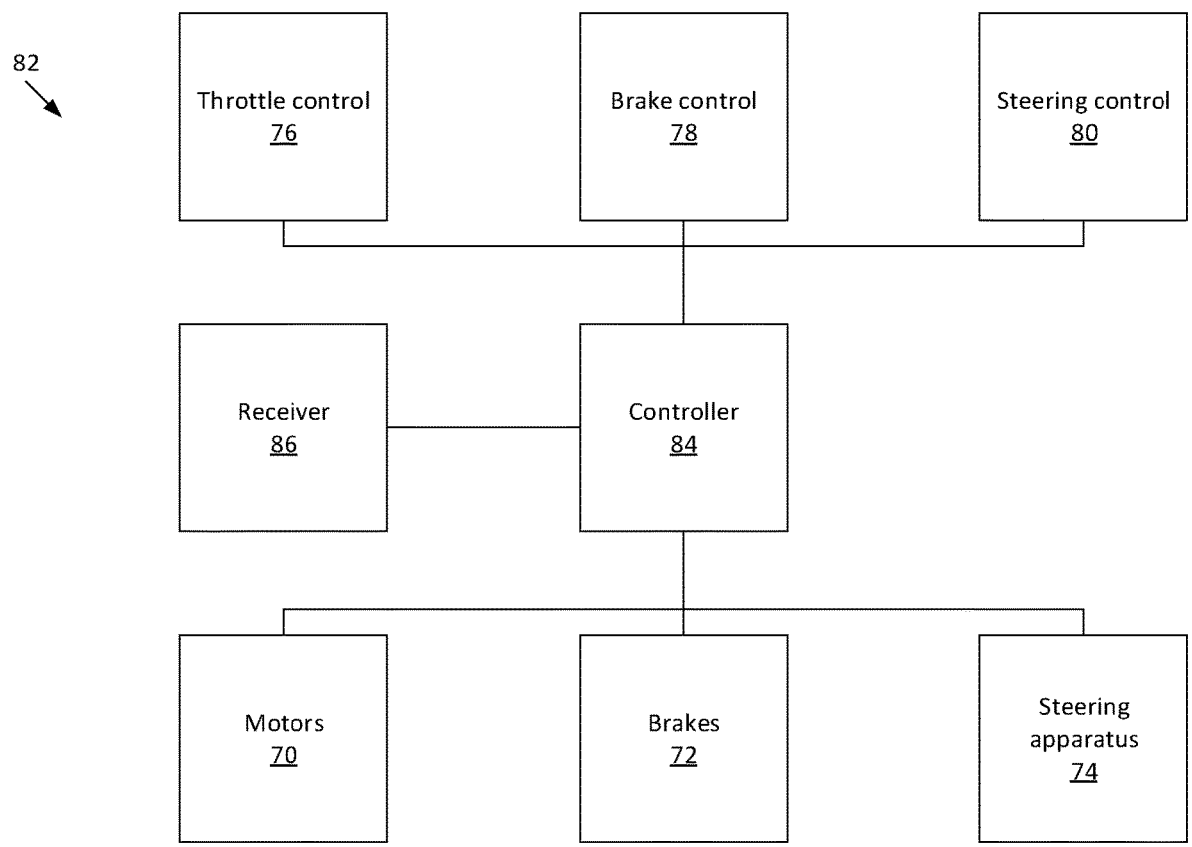
FIG. 3 is a block diagram of a control system for the scooter of FIG. 1.

With reference to FIG. 3, a steering apparatus 74 may be connected to the rear wheels 36 and to the driver platform 40. The steering apparatus 74 may be any suitable mechanism to turn the rear wheels 36 relative to a vertical axis V, for example, a linear actuator or a pair of linear actuators.

The handlebar 68 may include a throttle control 76. The throttle control 76 may have a cuff shape and rotate relative to the handlebar 68 to indicate a desired acceleration or speed. The throttle control 76 may be in communication with the motors 70.

The handlebar 68 may include a brake control 78. The brake control 78 may be, e.g., a trigger or a squeezable handle. The brake control 78 may be, e.g., squeezed by the driver to indicate that braking is desired. The brake control 78 may be in communication with the brakes 72.

The handlebar 68 may include a steering control 80. A portion of the handlebar 68 may move relative to the handlebar 68 or may register pressure feedback from, e.g., hands of the driver to determine a desired yaw angle. The steering control 80 may be in communication with the steering apparatus 74.

With continued reference to FIG. 3, the scooter 30 may include a control system 82. The control system 82 includes a controller 84 in communication with the throttle control 76, the brake control 78, the steering control 80, a receiver 86, the motors 70, the brakes 72, and the steering apparatus 74. The components of the control system 82 may be in communication over a communications network 88.

The controller 84 may be a microprocessor-based controller. The controller 84 may include a processor, memory, etc. The memory of the controller 84 may store instructions executable by the processor. The controller 84 is in communication with the motors 70, for example, with the first motor 70 and the second motor 70.

The receiver 86 receives wireless signals. The signals may be transmitted by any acceptable standard, such as Wi-Fi, Bluetooth, or cellular signals such as 4G LTE. Alternatively, the receiver 86 may be a data connector disposed to connect to a rental station (described below). The receiver 86 may be a first data connector. The receiver 86 is in communication with the controller 84.

The control system 82 may transmit signals through a communications network 88, such as a controller area network (CAN) bus, Ethernet, and/or by any other wired or wireless communication network.

The controller 84 is programmed to instruct the motors 70, for example, the first motor 70 and the second motor 70, to move the scooter from the stowed state in which the front and driver platforms 38, 40 are substantially parallel to each other to the cargo state in which the front and driver platforms 38, 40 are axially aligned with each other. The controller 84 may be programmed to instruct the motors 70 to rotate the front wheels 34 and the rear wheels 36 in opposing directions to move the scooter 30 between the stowed position and the cargo position.

With reference to FIGS. 2A-C, when a driver wants the scooter 30 to transition from the cargo state (as shown in FIG. 2C) to the stowed state (as shown in FIG. 2A), first the handlebar 68 rotates from the ready position to the stowed position. Then the driver sends a signal to the receiver 86, which communicates to the controller 84. The controller 84 instructs the motors 70 to roll the front wheels 34 in reverse and the rear wheels 36 forward. As shown in FIG. 2B, as the distance between the front wheels 34 and the rear wheels 36 decreases, the hinge 42 rises and the front and driver platforms 38, 40 rotate about the hinge 42 from horizontal to vertical. When the platforms 38, 40 are oriented vertically, as shown in FIG. 2C, the controller 84 instructs the motors 70 to stop rolling the wheels 34, 36. The front platform 38 is substantially the same length as the driver platform 40, which means that when the scooter 30 is in the stowed state, the front and driver platforms 38, 40 are oriented vertically and the front and rear wheels 36 touch the ground.

When a driver wants the scooter 30 to transition from the stowed state to the cargo state, the driver sends a signal to the receiver 86, which communicates to the controller 84. The controller 84 instructs the motors 70 in the front wheels 34 to roll the front wheels 34 forward and instructs the motors 70 in the rear wheels 36 to roll the rear wheels 36 in reverse. As the distance between the front wheels 34 and the rear wheels 36 increases, the hinge 42 lowers and the front and driver platforms 38, 40 rotate about the hinge 42 from vertical to horizontal. When the platforms 38, 40 are horizontal, the controller 84 instructs the motors 70 to stop rolling the wheels 34, 36. The handlebar 68 then rotates from the stowed position to the ready position.

With reference to FIG. 1, when the driver wants the scooter 30 to transition from the cargo state to the passenger state, the driver pulls the stowable seat back 60 from the position parallel to the front platform 38 to the upright position. The driver then lowers the stowable seat bottom 62 from the position parallel to the stowable seat back 60 to the horizontal position. When the driver wants the scooter 30 to transition from the passenger state to the cargo state (perhaps in order to transition to the stowed state), the driver reverses these steps.

Figure 4:
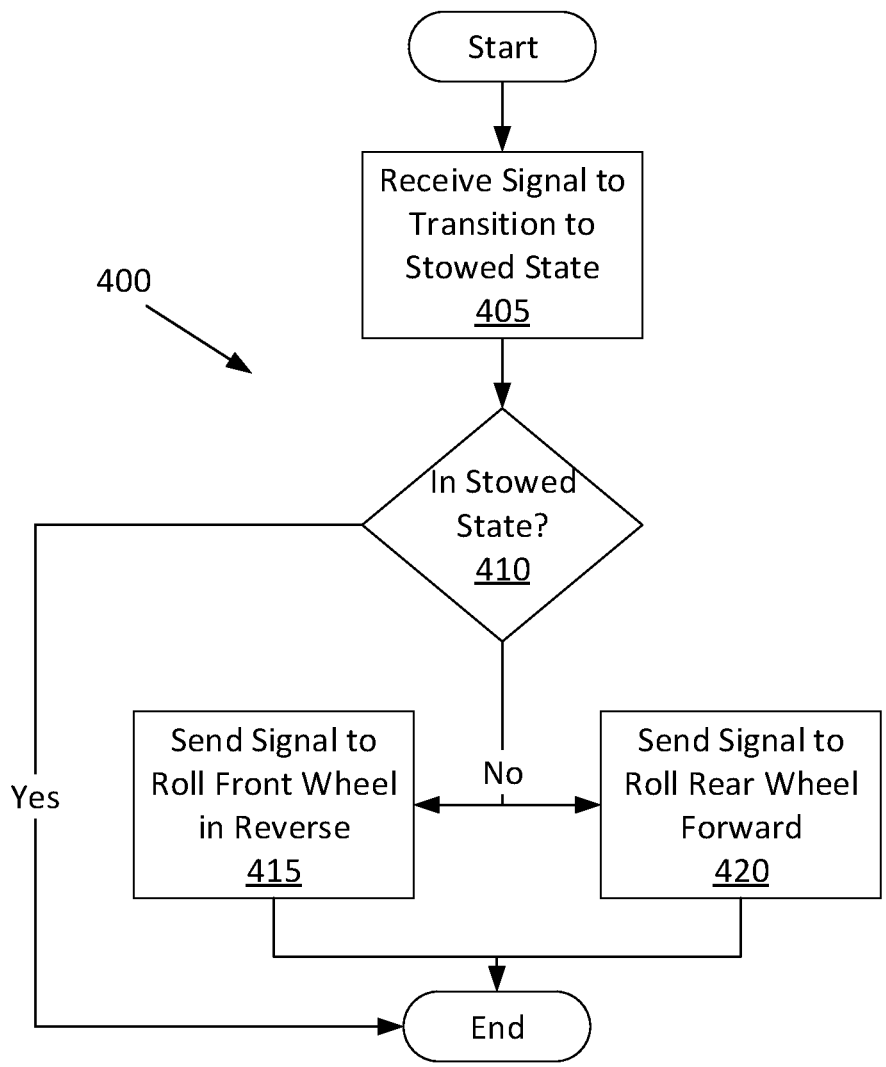
FIG. 4 is a process flow diagram for transitioning the scooter of FIG. 1 to the stowed state.

FIG. 4 is a process flow diagram illustrating an exemplary process 400 for transitioning the scooter 30 into the stowed state. The process 400 begins in a block 405, in which the controller 84 receives a signal from the receiver 86 instructing that the scooter 30 transition to the stowed state. The receiver 86 may provide the signal to the controller 84 in response to the receiver 86 receiving, for example, a signal from the driver.

Next, in a decision block 410, the controller 84 determines whether the scooter 30 is already in the stowed state. If the scooter 30 is in the stowed state, then the process 400 ends.

If the scooter 30 is not in the stowed state, next, in a block 415, the controller 84 sends a signal to the motor 70 connected to the front wheel 34 to rotate the front wheel 34 in reverse for a preset distance. Simultaneously, in a block 420, the controller 84 sends a signal to the motor 70 connected to the rear wheel 36 to rotate the rear wheel 34 forward for a preset distance. The preset distances may be the same and may be set to approximately half of a length of the scooter 30. Alternatively, the controller 84 may send a signal to the motor 70 connected to one of the front wheel 34 and the rear wheel 36 to rotate that wheel in reverse or forward, respectively, for a preset distance set to approximately a full length of the scooter 30, and the controller 84 simultaneously may send a signal to the brakes 72 connected to the other of the front wheel 34 and the rear wheel 36 to stop rotation of that wheel. After the blocks 415 and 420, the process 400 ends.

Figure 5:
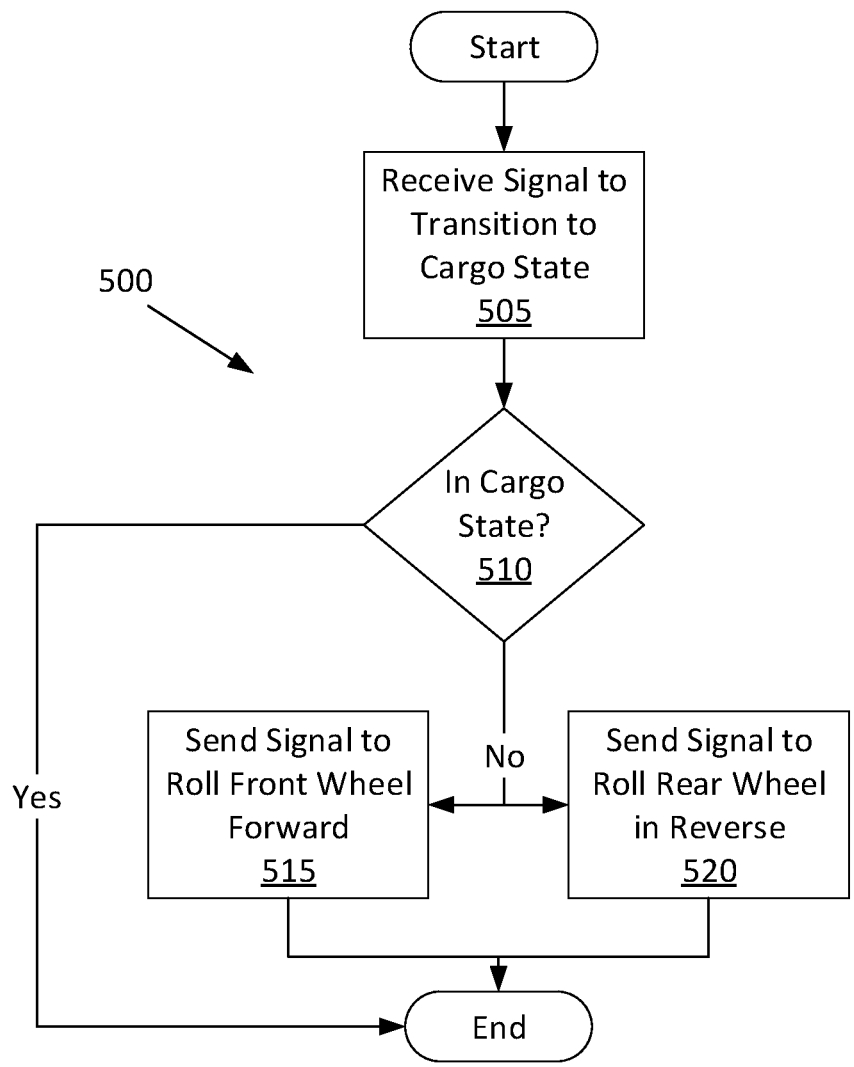
FIG. 5 is a process flow diagram for transitioning the scooter of FIG. 1 to the cargo state.

FIG. 5 is a process flow diagram illustrating an exemplary process 500 for transitioning the scooter 30 into the cargo state. The process 500 begins in a block 505, in which the controller 84 receives a signal from the receiver 86 instructing that the scooter 30 transition to the cargo state.

Next, in a decision block 510, the controller 84 determines whether the scooter 30 is already in the cargo state. If the scooter 30 is in the cargo state, then the process 500 ends.

If the scooter 30 is not in the cargo state, next, in a block 515, the controller 84 sends a signal to the motor 70 connected to the front wheel 34 to rotate the front wheel 34 forward for a preset distance. Simultaneously, in a block 520, the controller 84 sends a signal to the motor 70 connected to the rear wheel 36 to rotate the rear wheel 34 in reverse for a preset distance. The preset distances may be the same and may be set to approximately half of a length of the scooter 30. Alternatively, the controller 84 may send a signal to the motor 70 connected to one of the front wheel 34 and the rear wheel 36 to rotate that wheel forward or in reverse, respectively, for a preset distance set to approximately a full length of the scooter 30, and the controller 84 simultaneously may send a signal to the brakes 72 connected to the other of the front wheel 34 and the rear wheel 36 to stop rotation of that wheel. After the blocks 515 and 520, the process 500 ends.

The scooter 30 may be compatible with rental stations (not shown). The rental station may include a user interface at which the driver may select options and provide information and/or payment in order to borrow or rent a scooter 30.

Each rental station may include a series of locking mechanisms. The locking mechanisms are configured to engage with a plurality of scooters 30. The locking mechanism may be adjustable between a locked state engaged with the scooter 30 and an unlocked state disengaged with the scooter 30.

The rental station includes a second data connector. The rental station may include a plurality of data connectors to communicate with scooters 30 that are engaged with the locking mechanisms at the rental station. The first data connector is communicatively connected with the second data connector when the locking mechanism is in the locked state.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A scooter comprising:
   a front platform and a driver platform rotatably connected to each other and each having a planar surface;
   wheels rotatably connected to the front platform and the driver platform;
   a motor in at least one of the wheels;
   a seat attached to the front platform; and
   a strap;
   wherein the front platform and driver platform are relatively rotatable between a stowed position in which the planar surfaces are in separate planes and a cargo position in which the planar surfaces are coplanar;
   the seat is movable relative to the front platform from a closed state to an open state; and
   the strap extends across the planar surface of the front platform when the seat is in the closed state and extends across the seat bottom when the seat is in the open state.

2. The scooter of claim 1, wherein a first axis about which the front platform and the driver platform relatively rotate is parallel to a second axis about which at least one of the wheels rotates.

3. The scooter of claim 2, wherein the planar surface of the front platform is longer along the first axis than a thickness of the front platform perpendicular to the planar surface of the front platform.

4. The scooter of claim 3, wherein the planar surface of the front platform is longer along a direction perpendicular to the first axis than the thickness of the front platform.

5. The scooter of claim 2, wherein the planar surface of the driver platform is longer along the first axis than a thickness of the driver platform perpendicular to the planar surface of the drive platform.

6. The scooter of claim 5, wherein the planar surface of the driver platform is longer along a direction perpendicular to the first axis than the thickness of the driver platform.

7. The scooter of claim 1, wherein the motor is disposed in and drivably connected to the wheel that is rotatably connected to the front platform, and further comprising another motor disposed in and drivably connected to the wheel that is rotatably connected to the driver platform.

8. The scooter of claim 7, further comprising a controller in communication with the motors and programmed to instruct the motors to move the scooter between the stowed position and the cargo position.

9. The scooter of claim 8, wherein the controller is programmed to instruct the motors to rotate the front and rear wheels in opposing directions to move the scooter between the stowed position and the cargo position.

10. The scooter of claim 7, further comprising a receiver in communication with the controller.

11. The scooter of claim 1, further comprising a hinge rotatably connecting the front platform and the driver platform, and a handlebar rotatably connected to the hinge.

12. The scooter of claim 11, wherein the handlebar is movable from a stowed position adjacent to an edge of the driver platform to a ready position spaced from and transverse to the driver platform.

13. The scooter of claim 1, wherein the front platform has a recess configured to receive the seat.

14. The scooter of claim 1, wherein the seat includes a seat back rotatably connected to the hinge and a seat bottom rotatably connected to the seat back.

15. The scooter of claim 1, wherein the seat in the closed state is flush with the planar surface of the front platform.

16. A scooter comprising:
   a front platform and a driver platform rotatably connected to each other and each having a planar surface;
   wheels rotatably connected to the front platform and the driver platform;
   a motor in at least one of the wheels;
   a hinge rotatably connecting the front platform and the driver platform; and
   a handlebar rotatably connected to the hinge at the hinge, the handlebar being rotatable around the hinge independently of the front platform and of the driver platform;
   the front platform and driver platform being relatively rotatable between a stowed position in which the planar surfaces are in separate planes and a cargo position in which the planar surfaces are coplanar.

* * * * *